United States Patent Office 3,694,398
Patented Sept. 26, 1972

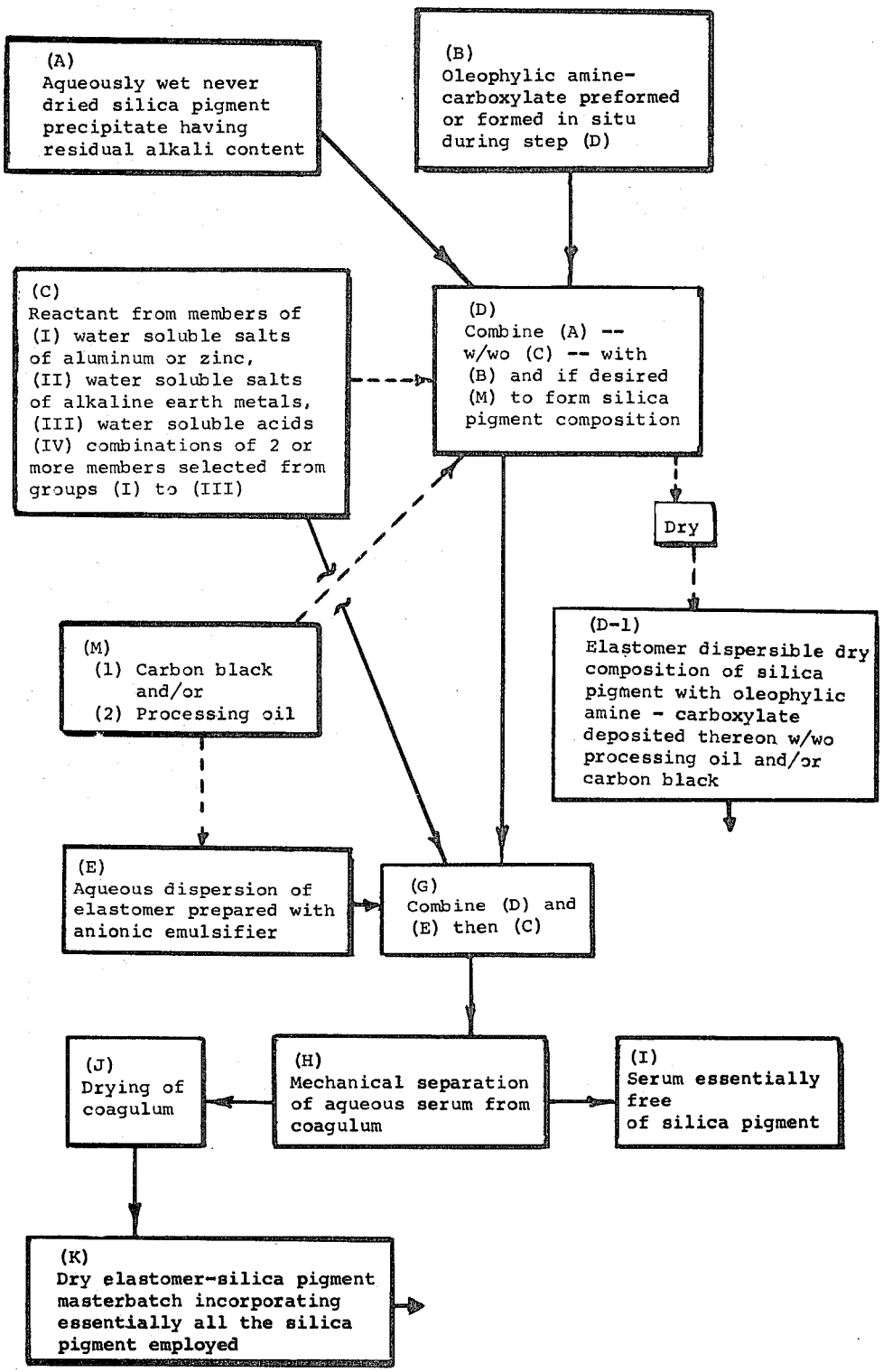

3,694,398
SILICA PIGMENTS AND ELASTOMER-SILICA PIGMENT MASTERBATCHES AND PRODUCTION PROCESSES RELATING THERETO
Oliver W. Burke, Jr., 1510 SW. 13th Court, Fort Lauderdale, Fla. 33061
Continuation-in-part of application Ser. No. 798,215, Sept. 16, 1968, which is a division of application Ser. No. 611,250, Jan. 24, 1967, now Patent No. 3,523,096, which in turn is a continuation-in-part of applications Ser. No. 458,379 and Ser. No. 458,420, both May 24, 1965, and Ser. No. 479,806, Aug. 16, 1965, now Patent No. 3,401,017. This application July 16, 1970, Ser. No. 55,479
Int. Cl. C08c 11/10; C08d 9/00
U.S. Cl. 260—33.6 AD
7 Claims

ABSTRACT OF THE DISCLOSURE

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried therefrom after its precipitation, with (2) a quantity of oleophilic amine carboxylate material, (3) combining the resulting treated wet silica pigment slurry with an aqueous dispersion of the elastomer containing an anionic dispersing agent, with or without (4) carbon black and/or processing oil, and (5) with selected reactant-coagulant, and (b) recovering the resulting coagulum as a masterbatch, the steps prior to (b) having rendered the serum of the aqueous mixture essentially free of silica pigment. Prior to combination with the elastomer dispersion the oleophilic amine carboxylate treated silica pigment may be recovered as a useful dispersible silica pigment product, or the wet silica pigment may be treated with water soluble salts of aluminum and/or zinc and/or alkaline earth metal and/or water soluble acid, together with the oleophilic amine carboxylate, and after such treatment the resulting pigment composition may be recovered from the slurry with or without prior addition of processing oil to the slurry, as a useful dispersible silica pigment composition, or the so treated wet silica pigment may be combined as in (3), (4) and (5) above, and be recovered as in (b) above in the form of a masterbatch.

CROSS REFERENCE TO RELATED APPLICATIONS

This application is a continuation-in-part of copending applications Ser. No. 798,215 (now abandoned), filed Sept. 16, 1968 as a division of application Ser. No. 611,250 filed Jan. 24, 1967 (now U.S. Pat. 3,523,096) said application Ser. No. 611,250 having been a continuation-in-part of earlier applications Ser. No. 458,420, filed May 24, 1965 (now abandoned); Ser. No. 458,379, filed May 24, 1965 (now abandoned); and Ser. No. 479,806, filed Aug. 16, 1965 (now U.S. Pat. 3,401,017), the disclosures of all of which are incorporated herein by reference. Furthermore, this application is directed to a species of invention that was deemed nonelected and withdrawn from consideration in applicant's copending application Ser. No. 55,384, filed July 16, 1970.

BACKGROUND OF THE INVENTION (1) Field of the invention

The field to which this invention pertains is the preparation of dispersible silica pigments and of masterbatches from latices (i.e. aqueous dispersion) of elastomers and aqueous slurries of precipitated silica pigments.

(2) Description of the prior art

It is well known in the art that attempts to make masterbatches from elastomer latex and aqueously dispersed hydrated silica pigment by latex masterbatching have resulted in loss of large amounts of the hydrated silica pigment in the mother liquor and in non-uniform masterbatches, and that even the addition of tetraethylene pentamine (Whitby, Synthetic Rubber, John Wiley & Sons, Inc., New York, 1954, page 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market, nor are the dispersible dry silica pigment compositions provided by this invention known.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—i.e., the formation of silica gel—and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitate having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention, inter alia, provides a simple and efficient process for the curbing of silica pigment losses and the promotion of uniformity of product in the preparation of masterbatches of measured silica pigment content. The invention resides in treating never dried wet silica pigment with oleophilic amine carboxylate material. The invention further resides in combining the amine carboxylate treated silica with an aqueous dispersion of elastomer prepared with anionic emulsifier and coagulating and recovering the masterbatch. As shown in the drawing, the first part of the process consists essentially in (A) providing 5 to 100 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation;

(B) providing a quantity of from 0.1 to 20% by weight, based on the silica pigment, dry basis, referred to in step (A), of oleophilic amine carboxylate material, e.g. from the class consisting of the neutral basic and acidic carboxylic acid salts of amines wherein at least an amine or a carboxyl group has attached thereto a chain of at least 8 carbon atoms imparting oleophilic properties to the compound;

(C) providing a supply of reactant material selected from the class consisting of the members of the following groups: Group (I) the water soluble salts of aluminum or zinc; Group (II) the water soluble salts of the alkaline earth metals; Group (III) the water soluble acid; and Group (IV) combinations of two or more members selected from Groups (I), (II) and (III);

(D) combining the wet silica pigment—from (A)—with or without reactant—from (C)—in an amount up to at least about a stoichiometric equivalent of the alkalinity of the said pigment, with (1) the oleophilic amine carboxylate—from (B)—; (2) from 0 to 75 parts by weight of carbon black with the limitation that the total of silica pigment and carbon black, dry basis, not exceed 80 parts by weight and (3) from 0 to 45 parts by weight of processing oil based on dry solids of the mixture, to form an aqueously wet rubber dispersible hydrated silica pigment composition.

The silica pigment composition so provided, when formed with the oleophilic amine carboxylate, with or without reactant from (C) and/or processing oil and/or carbon black from (M), may be dried to yield useful dispersible dry silica pigment compositions as indicated at (D-1), and in any event, may be used without drying, e.g. in the second part of the masterbatching process, by (E) providing an aqueous dispersion containing (1) 100 parts by weight of the elastomer and (2) from 0.5 to 15 parts by weight of anionic dispersing agent;

(G) mixing the aqueous dispersion of elastomer—from (E)—with the pigment composition prepared by step (D) and with a sufficient quantity of the reactant material provided in step (C) to cause coagulation of the solids of the combination, whereby there is formed a coagulum of such solids rendering the aqueous serum of the combination essentially free of silica pigment; and (H) to (K) recovering the coagulum as a masterbatch.

Under these conditions the steps prior to the recovery render the serum resulting from the coagulation essentially free of silica pigment, thus assuring a uniform silica pigment content in the masterbatch. The achievement of this desideratum is evidenced by the fact that when the coagulum is mechanically removed from the serum as indicated at (H), the serum (I) is found to be essentially free of silica pigment.

In the making of the dispersible pigment compositions the reactant—from (C)—is employed in an amount of from 0 to at least a stoichiometric equivalent, based on the alkalinity of the silica pigment; the carbon black—from (M)—in the range of 0 to 1500 parts per 100 parts of the silica pigment, dry basis by weight, and the processing oil—from (M)—in the range of 0 to 45 parts by weight per 80 parts of dry solids of the mixture.

Useful processes and products provided by the invention are more fully described and exemplified by preferred embodiments hereinafter and are more particularly pointed out in the appended claims.

In preferred embodiments of the invention, the reactant employed in steps (D) and/or (G) may be chosen predominantly from Group (I) or Group (III) and the serum produced is then acidic or alkaline, respectively, and corresponding compounds are contained in the products; and in further preferred embodiments, the blend (G), and the masterbatch (K) produced therefrom, contains at least 2 parts of carbon black per 3 parts of silica pigment, dry basis by weight.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

When processing oil and/or carbon black (M) are incorporated at (D) the resulting compositions (D) may be dried to produce new and useful rubber-dispersible products (D-1).

DESCRIPTION OF THE PREFERRED EMBODIMENTS

Preferred embodiments of the present invention avoid the use of organic additives such as tetraethylene pentamine, glue, gelatin, casein, etc., which increase the cost and may affect the curing properties of the masterbatch.

The invention, inter alia, may be used to improve wet silica pigment masterbatching and masterbatches using any aqueously wet never dried hydrated silica pigment precipitate prepared by precipitation from an aqueous solution of alkali-metal silicate with the aid of carbon dioxide and containing bound alkali, and is applicable to the formation of masterbatches therewith with elastomer latices prepared with anionic emulsifier of the type coagulable with the water soluble acids and/or metal salts of the reactants (C).

Elastomer latices

The elastomer latices (i.e. aqueous dispersions) employed in the present invention include latices of diene homopolymer rubbers such as polybutadiene, polyisoprene, polychloroprene; those of diene copolymer and interpolymer rubbers such as the copolymers and interpolymers of diene monomers and monomers containing and copolymerizable or graft polymerizable therewith through a single ethylenically unsaturated group, e.g. butadiene-styrene, butadiene-acrylonitrile, or methacrylonitrile, butadiene-acrylate or methacrylate esters; and those of rubbery copolymers and interpolymers of hydrocarbon monomers with poly vinylidene (including vinyl) monomers, and such latices may be mixed or combined with processing oils or their aqueous emulsions to form oil-rubber-silica masterbatches, and any of the foregoing may be combined with carbon black and its aqueous dispersions, providing the silica pigment comprises an essential component of the e.g. carbon black-elastomer-silica masterbatch.

Silica pigments

Silica pigments containing residual alkali suitable for masterbatching in accordance with the present invention are usually precipitated by the gradual acidulation of aqueous sodium silicate solution, e.g. with the aid of carbon dioxide, and in accordance with the preferred embodiments of this invention are continuously maintained in an aqueously wet state without ever having been dried therefrom until incorporated in the masterbatching process.

Oleophilic amine-carboxylates

The materials designated by the term "oleophilic amine carboxylates," which may be employed in the present invention, are the members of the class consisting of (a) the neutral, basic and acidic carboxylic acid salts of amines, wherein (b) at least one amine group or carboxyl group has attached thereto a long carbon chain of at least 8 carbon atoms imparting oleophilic properties to the compound, which chain may be wholly or partly of linear, branched, cyclic or aromatic configuration and may be attached to but one amine or carboxyl group, or may bridge between two amine groups or between two carboxyl groups, (c) such oleophilic amine carboxylates being derived from precursor amines having from 1 to 10 primary and/or secondary and/or tertiary amine groups and not more than 36 carbon atoms per amine group, and from carboxylic acids having from 1 to 10 carboxyl groups and not over 36 carbon atoms per carboxyl group, and (d) such precursor amines and carboxylic acids having boiling points above the boiling point of water at atmospheric pressure.

The oleophilic amine carboxylates are prepared from (i) precursor amine material and (ii) precursor carboxylic acid material, and provided one of the precursor materials is selected from group (A) compounds and the other precursor material is selected from group (A) compounds or from group (B) compounds.

The Group (A) compounds include:

(A)(i) The precursor amines having from 1 to 10 primary and/or secondary and/or tertiary amine groups and not more than 36 carbon atoms per amine group and having at least one amine group attached to a long chain of at least 8 carbon atoms and not more than 36 carbon atoms as aforesaid.

(A)(ii) The precursor carboxylic acids having from 1 to 10 carboxylic acid groups and not more than 36 carbon atoms per carboxylic acid group and having at least one carboxyl group attached to a long chain of at least 8 carbon atoms and not more than 36 carbon atoms as aforesaid.

The Group (B) compounds include:

(B)(i) The precursor amines having 1 to 10 primary and/or secondary, and/or tertiary amine groups and no chain of more than 7 carbon atoms attached to any amine group, and said amines having their boiling point above the boiling point of water at atmospheric pressure.

(B)(ii) The precursor carboxylic acids having 1 to 10 carboxyl groups and no chain of more than 7 carbon atoms attached to any carboxyl group and said carboxylic acids having their boiling points above the boiling point of water at atmospheric pressure.

Group (A)(i) amines are exemplified by the following (1) long-chain primary amines represented by the formula $R\text{---}NH_2$ in which R contains from 8 to 36 carbon atoms and includes but is not limited to octyl amine, decyl amine, dodecyl amine, tetradecyl amine, hexadecyl amine, octadecyl amine, palmitoleyl amine, oleyl amine, linoleyl amine, linolenyl amine, the mixed primary amines derived from fatty oils such as coco amine, soybean amine, tallow amine, rosin amine, and partially or completely hydrogenated amines derived from the above unsaturated amines, and the like;

(2) long-chain secondary amines having at least a single alkyl substituent containing from 8 to 36 carbon atoms, e.g. long-chain secondary amines represented by the formula

in which R contains from 8 to 36 carbon atoms and R' contains from 1 to 36 carbon atoms, and includes but is not limited to dioctyl amine, didecyl amine, didodecyl amine, ditetradecyl amine, dihexadecyl amine, dioctadecyl amine, dipalmitoleyl amine, dioleyl amine, dilinoleyl amine, dilinolenyl amine, the mixed secondary amines derived from fatty oils such as dicoco amine, disoybean amine, ditallow amine, hydrogenated ditallow amine, N-methyloctylamine, N-methyldodecylamine, N-methylhexadecylamine, N-ethyloctylamine, N-ethyloctadecylamine, N-propyldodecylamine, N-butyloctylamine, and the like.

(3) long-chain tertiary amines having at least one alkyl or alkylene subsituent containing from 8 to 36 carbon atoms, e.g. (a) long chain tertiary amines represented by the formula

in which R contains 8 to 36 carbon atoms, R' contains 1 to 36 carbon atoms and R" contains 1 to 36 carbon atoms and includes but is not limited to trioctyl amine, tridodecyl amine, tristearyl amine, octyldimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and (b) long chain cyclic tertiary amines including but not limited to N-coco morpholine, N-soya morpholine, N-tallow morpholine and the like.

(4) long-chain diamines and polyamines having at least one alkyl or alkylene substituent containing from 8 to 36 carbon atoms including, but not limited to, the diamines represented by the formula $RNH(CH_2)_xNH_2$ in which R contains 8 to 36 carbon atoms and $x$ is an integer from 1 to 18, as for example N-coco-trimethylene diamine, N-soya trimethylene diamine, N-tallow trimethylene diamine, N-oleyl trimethylene diamine, N-octyl dimethylene diamine, N-octyl tetramethylene diamine, and the above diamines with one or more amine hydrogens replaced by a methyl, ethyl, propyl or butyl group, and the like.

(5) long-chain polyethoxylated and propoxylated secondary and tertiary amines containing at least one alkyl or alkylene substituent having from 8 to 36 carbon atoms e.g. the polyalkoxylated amines represented by the formulas

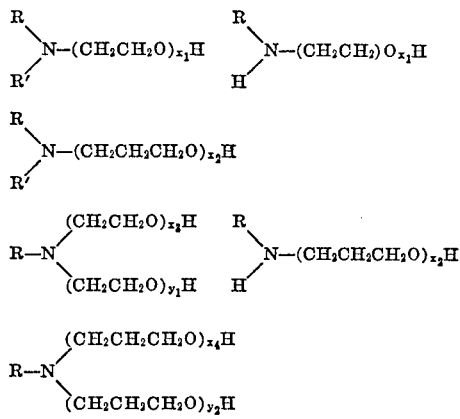

in which R contains 8 to 36 carbon atoms and R' contains 1 to 36 carbon atoms and $x_1$, $x_2$, $x_3$, $x_4$, $y_1$, $y_2$ are each integers between 1 and 30, and include but are not limited to coco amine, soybean amine, tallow amine and stearyl amine each reacted with a plurality, e.g. 2, 5, 10 or 15, moles of ethylene oxide or propylene oxide per mole of amine; and the like;

(6) long-chain polyethoxylated and polypropoxylated diamines having at least a single alkyl or alkylene substituent having from 8 to 36 carbon atoms e.g. the diamines represented by the formulas

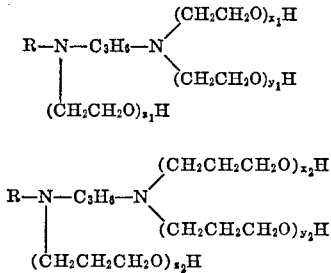

in which R contains 8 to 36 carbon atoms and $x_1$, $x_2$, $y_1$, $y_2$, $z_1$ and $z_2$ are each integers between 1 and 30, which include, but are not limited to, the reaction products of N-coco trimethylene diamine, N-soya trimethylene diamine and N-tallow trimethylene diamine each with a plurality, e.g. 3, 10 or 20 moles of ethylene oxide or propylene oxide per mole of amine, and the like.

The Group (A) (ii) carboxylic acids are exemplified as follows: the 8–22 carbon atom carboxylic acids which include, but are not limited to, caprylic, capric, lauric, myristic, mixed coco fatty acids, palmetic, and stearic acids, oleic, palm oil fatty acids, cottonseed oil fatty acids, distilled animal fatty acids, corn oil fatty acids, soya fatty acids, tall oil fatty acids, the rosin acids, abietic acid, the disproportionated rosin acids, hydroabietic acid, dehydroabietic acid, the naphthenic acids, the dimer acids derived from bodied soya bean oil, the trimer acids derived from bodied linseed oil, the fatty acids derived from fish oil and the fish oil polymer acids, the castor oil fatty acids, the unsaturated drying oil fatty acids and the partially and totally hydrogenated acids derived therefrom, synthetic fatty acids, and fatty acids with polar substituents and having at least 8 carbon atoms.

The Group (B) (i) amines are exemplified as follows: n-amylamine, the hexylamines, the heptylamines, ethylene diamine, the propylene diamines, e.g. 1,3-diaminopropane, the butylene, pentylene, hexylene and heptylene diamines, the ethylene and propylene substituted ethylene diamines and propylene diamine and polymers of these e.g. diethylene diamine, triethylene diamine, tetraethylene triamine, pentaethylene tetramine, hexaethylene pentamine, octaethylene heptamine and the like; monoethanolamine, diethanolamine, triethanolamine, the propanolamines, the dipropanolamines, the tripropanolamines, the hydroxy $C_4$ amines, the hydroxy $C_5$ amines, the hydroxy $C_6$ amines, the hydroxy $C_7$ amines and similar diamines and triamines having hydroxyl groups; morpholine and the substituted morpholines in which the substituents in the 4, 2 and 6 positions of the morpholine may be one or more methyl, ethyl, propyl and the like alkyl groups, hydroxyl groups or amine groups, and other amines having boiling points over 100° C. at atmospheric pressure and having no carbon chains greater than 7 carbon atoms attached to an amine group.

The Group (B) (ii) carboxylic acids are exemplified as follows: acetic, propionic, butyric, valeric, caproic, heptanoic and their isomers, oxalic, fumaric, adipic, succinic, malonic, glutaric, caproic, suberic, pimelic, hydroxyacetic, lactic, glyceric, 2-hydroxybutanoic, and the like.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solid types can be converted to the liquid state for use herein with the aid of solvent or plasticizer) and include the processing materials set forth under "Plasticizers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex–20, –419, –726, –757, –787 (TM), and Califlux TT (TM) and other oils suitable for rubber compounding or the oil extension of synthetic rubber (d) the coumarone-indene oils and resins, e.g. Cumar Resin RH, –P10, –T(TM); (e) the liquid ester type pasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125, (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

EXAMPLES

The following examples will serve to illustrate the invention in more detail:

Silica preparation and Examples 1–25

The aqueous slurry of precipitated silica employed in Examples 1–41 was prepared in a manner similar to Example 9 of U.S. Pat. No. 3,250,594 except that the ratio of 41° Bé. commercial sodium silicate $(Na_2O/(SiO_2)_{3.22})$ to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound alkali content of about 1.5% by weight as NaO, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I thereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2'-methylene-bis (4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged over-night, re-milled and cured for 45 minutes at 287° F.

The physical test data for the vulcanizate so prepared with the foregoing silica pigment is set forth in Table II hereof.

TABLE II

| Silica tested (in vulcanizate) | Silica Pigment-II |
|---|---|
| Hardness (Shore A) | 72 |
| Tensile (p.s.i.) | 3530 |
| Modulus (300%) | 1140 |
| Elong. (percent) | 575 |

In various of the following examples the elastomer latex and the prepared slurry of oleophilic amine carboxylate treated silica pigment were blended together before combining them with the coagulant. In other embodiments, while still stirring, the coagulant-aqueous solution was progressively added at a rate enabling it to be mixed in without producing local coagulation, until coagulation throughout the mixture occurred, and on separation of the coagulum from the aqueous phase the serum was essentially free of silica pigment.

In still other embodiments, the blended polymer latex and treated aqueous silica pigment slurry were run into the coagulating solution while stirring, and this procedure also yielded a coagulum comprising essentially all of the elastomer and silica pigment, leaving the serum completely or essentially free of the pigment.

It has also been found that streams of the elastomer latex, the treated silica pigment slurry, and the coagulant, can be run concurrently into the coagulation vessel while stirring, and that this procedure also will yield a coagulum containing essentially all of the silica pigment, leaving essentially no silica pigment in the aqueous phase. Thus the processes of the examples are adaptable for either continuous or batch production of the masterbatch. In those instances in which an oil-rubber-silica pigment masterbatch is desired, up to about 45% of oil based on the elastomer is added to the latex prepared with anionic emulsifier according to the foregoing examples, if desired with a small amount of ammonium hydroxide to aid dispersion of the oil into the elastomer, and it will thus be understood that the masterbatch and elastomer dispersion contemplated by the invention may contain a minor proportion of oil. Similarly in the examples any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer latex and/or the aqueous dispersion of silica pigment and/or the aqueous coagulant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1 through 38 the ingredients (A), (B), (C), etc., are listed in the order of their addition, except where otherwise specifically set forth. These examples were carried out at ambient temperatures, however, more elevated temperatures may be employed, e.g. to accelerate the processing. In these examples, there is combined with (a) an aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation; (b) from 0.1 to 20%, based on the pigment, dry basis by weight, of water soluble oleophilic amine carboxylate material and sufficient reactant from the class consisting of water soluble acids and water soluble salts of aluminum and/or zinc and/or alkaline earth metals, to react with part or all of the alkali content of the pigment thereby to form a wet pigment composition; (c) such wet pigment composition may include, or be combined with from 0 to 45 parts of processing oil per 80 parts of the pigment, dry basis by weight, and (d) recovering and drying of the solids therefrom yields a dry hydrated silica pigment composition suitable for dry dispersion in elastomer compounding. The addition of the oil after step (D) in the drawing is advantageous as the oil is then readily distributed in a most uniform manner throughout the water insoluble oleophilic amine carboxylate treated silica pigment composition, and drying thereof yields a uniform product with even more reduced tendency to dust as well as augmented dispersibility in dry elastomers and augmented bulk density.

TABLE III.—SILICA-POLYMER MASTERBATCH

[Parts by weight]

| Example | 1 | 2 | 3 |
|---|---|---|---|
| (A) Silica pigment slurry: | | | |
| Alkaline silica pigment-I (pH=8.5–9.5) | 25 | 25 | 25 |
| Dry solids basis | 2.5 | 2.5 | 2.5 |
| Water | 20 | 20 | 20 |
| (B) Reactant-aqueous solution: | | | |
| 2% zinc sulfate | 6.5 | | |
| 2% aluminum sulfate [1] | 9.0 | | |
| (C) Blend (A) and (B): | | | |
| Blend (X) | X | X | X |
| Filter (X) | X | X | X |
| (D) Oleophilic amine carboxylate: | | | |
| Tallow amine oleate [2] | 0.25 | | |
| Coco amine acetate [3] | | 0.05 | 0.05 |
| Benzene | 2 | 2 | 2 |
| Water | 20 | 20 | 20 |
| (E) Blend (C) and (D): Blend (X) | X | X | X |
| (F) Polymer latex: | | | |
| Butadiene-styrene [4] | 25.4 | 25.4 | 25.4 |
| Dry solids basis | 5 | 5 | 5 |
| Antioxidant [5] | 0.1 | 0.1 | 0.1 |
| Water | 40 | 40 | 40 |
| (G) Coagulant-aqueous reactant solution: 2% aluminum sulfate [1] | 10 | 10 | 16 |
| (H) Coagulation: | | | |
| Combine (E) and (F) then (G), (X) | X | X | X |
| pH serum | 4.0 | 4.0 | 4.0 |
| Silica in serum | None | None | None |
| (I) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Armeen T oleate, a trademark product.
[3] Armac C, a trademark product.
[4] SB–R 1502 (dry solids 19.7%).
[5] The antioxidant is 2,2'-methylene-bis-(4-methyl-6-t.-butylphenol).

TABLE IV.—SILICA-POLYMER MASTERBATCH

[Parts by weight]

| Example | 4 | 5 | 6 |
|---|---|---|---|
| (A) Silica pigment slurry: | | | |
| Alkaline silica pigment-I (pH=8.5–9.5) | 25 | 25 | 25 |
| Dry solids basis | 2.5 | 2.5 | 2.5 |
| Water | 20 | 20 | 20 |
| (B) Reactant-aqueous solution: | | | |
| 2% aluminum sulfate [1] | 9 | | |
| 2% calcium chloride | | 5 | |
| 2% sulfuric acid | | | 4.5 |
| (C) Blend (A) and (B): | | | |
| Blend (X) | X | X | X |
| Filter (X) | X | X | X |
| (D) Oleophilic amine carboxylate: | | | |
| Oleyl amine acetate [2] | 0.02 | 0.1 | |
| Tallow amine acetate [3] | | | 0.03 |
| Water | 20 | 20 | 20 |
| (E) Polymer latex: | | | |
| Butadiene-styrene [4] | 25.4 | 25.4 | 25.4 |
| Dry solids basis | 5 | 5 | 5 |
| Antioxidant [5] | 0.1 | 0.1 | 0.1 |
| Water | 40 | 40 | 40 |
| (G) Coagulant-aqueous reactant solution: | | | |
| 2% aluminum sulfate | 10 | | 10 |
| 2% calcium chloride | | 12 | |
| (H) Coagulation: | | | |
| Combine (E) and (F) then (G), (X) | X | X | X |
| pH serum | 4.5 | 6.5 | 4.5 |
| Silica in serum | None | None | None |
| (I) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Armac O, a trademark product.
[3] Armac T, a trademark product.
[4] SB–R 1502 (dry solids 19.7%).
[5] The antioxidant is 2,2'-methylene-bis-(4-methyl-6-t.-butylphenol).

TABLE V.—SILICA-POLYMER MASTERBATCH

[Parts by weight]

| Example | 7 | 8 | 9 | 10 |
|---|---|---|---|---|
| (A) Silica pigment slurry: | | | | |
| Alkaline silica pigment-I (pH=8.5–9.5) | 25 | 25 | 25 | 25 |
| Dry solids basis | 2.5 | 2.5 | 2.5 | 2.5 |
| Water | 20 | 20 | 20 | 2.0 |
| (B) Reactant-aqueous solution: | | | | |
| 2% aluminum sulfate [1] | 9 | | | |
| 2% zinc sulfate | | 6 | | |
| 2% sulfuric acid | | | 4.5 | |
| (C) Blend (A) and (B): | | | | |
| Blend (X) | X | X | X | X |
| Filter (X) | X | X | X | X |
| (D) Oleophilic amine carboxylate: | | | | |
| 33%* N-oleyl trimethylene diamine oleate [2] | 0.44 | | | |
| 33%* N-tallow trimethylene diamine dioleate [3] | | 0.74 | | |
| 33%* tallow amine oleate [4] | | | 0.25 | |
| 33%* tallow amine stearate [5] | | | | 0.74 |
| (E) Blend (C) and (D): Blend (X) | X | X | X | X |
| (F) Polymer latex: | | | | |
| Butadiene-styrene [6] | 25.4 | 25.4 | 25.4 | 25.4 |
| Dry solids basis | 5 | 5 | 5 | 5 |
| Antioxidant [7] | 0.1 | 0.1 | 0.1 | 0.1 |
| (G) Coagulant-aqueous reactant solution: | | | | |
| 2% aluminum sulfate [1] | 10 | 10 | 10 | 3 |
| 2% sulfuric acid | | | | 1.5 |
| (H) Coagulation: | | | | |
| Combine (E) and (F) then (G), (X) | X | X | X | X |
| pH of serum | 4.0 | 4.0 | 4.0 | 4.0 |
| Silica in serum | None | None | None | None |
| (I) Masterbatch: | | | | |
| Filter and wash (X) | X | X | X | X |
| Dried (105° C.) (X) | X | X | X | X |

[1] Aluminum sulfate $Al_2(SO_4)_3 \cdot 14H_2O$.
[2] Duomeen O oleate, a trademark product.
[3] Duomeen TDO, a trademark product.
[4] Armeen TO, a trademark product.
[5] Armeen T stearate, a trademark product.
[6] SB–R 1502 (dry solids 19.7%).
[7] The antioxidant is 2,2'-methylene-bis-(4-methyl-6-t.-butylphenol).
*In benzene.

TABLE VI.—SILICA-POLYMER MASTERBATCH

[Parts by weight]

| Example | 11 | 12 | 13 | 14 |
|---|---|---|---|---|
| (A) Silica pigment slurry: | | | | |
| Alkaline silica pigment-I (pH=8.5–9.5) | 25 | 25 | 25 | 25 |
| Dry solids basis | 2.5 | 2.5 | 2.5 | 2.5 |
| Water | 20 | 20 | 20 | 20 |
| (B) Reactant-aqueous solution: | | | | |
| 2% aluminum sulfate [1] | 9 | | | |
| 2% zinc sulfate | | 6 | | |
| 2% calcium chloride | | | 5 | |
| 2% sulfuric acid | | | | 4.5 |
| (C) Blend (A) and (B): | | | | |
| Blend (X) | X | X | X | X |
| Filter (X) | X | X | X | X |
| (D) Oleophilic amine carboxylate: | | | | |
| 25%* diethylenetriamine monooleate | 0.24 | 0.20 | | |
| 25%* diethylenetriamine dioleate | | | 0.20 | |
| 25%* diethylenetriamine trioleate | | | | 0.20 |
| 6.4% aqueous ammonia | | | 2 | 2 |
| (F) Polymer latex: | | | | |
| Butadiene-acrylonitrile modified [2] | 12.6 | | | |
| Butadiene-acrylonitrile [3] | | 12.2 | | |
| Chloroprene [4] | | | 8.6 | 8.6 |
| Dry solids basis | 5 | 5 | 5 | 5 |
| Water | 40 | 40 | 40 | 40 |
| (G) Coagulant-aqueous reactant solution: 2% aluminum sulfate [1] | 10 | 10 | 24 | 24 |
| (H) Coagulation: | | | | |
| Combine (E) and (F) then (G), (X) | X | X | X | X |
| pH serum | 4.5 | 4.5 | 4.0 | 4.0 |
| Silica in serum | None | None | None | None |
| (I) Masterbatch: | | | | |
| Filter and wash (X) | X | X | X | X |
| Dried (105° C.) (X) | X | X | X | X |

[1] Aluminum sulfate $Al_2(SO_4)_3 \cdot 14H_2O$.
[2] Hycar 1570 (39.8% solids latex), a trademark product which is a carboxyl modified butadiene/acrylonitrile latex.
[3] Hycar 1561 (41% solids latex), a trademark products.
[4] Neoprene 635 (58% solids latex), a trademark product.
[5] Antioxidant 2,2'-methylene-bis-(4-methylene-6-t.-butylphenol).
*In isopropanol and benzene (1 to 1).

TABLE VII.—TREATED SILICA
[Parts by weight]

| Example | 15 | 16 | 17 | 18 |
|---|---|---|---|---|
| Silica pigment-treated: | | | | |
| (a) Silica pigment slurry: | | | | |
| Alkaline silica pigment-I (pH 9.5) | 150 | 150 | 150 | 150 |
| Dry solids basis | 15 | 15 | 15 | 15 |
| Water | 50 | | 50 | |
| (b) Reagent-aqueous solution: | | | | |
| 2% aluminum sulfate [1] | 55 | | 55 | |
| Silica slurry pH | 5.0 | 9.5 | 5.0 | 9.5 |
| (c) Silica pigment: | | | | |
| Filtered (X) | X | X | X | X |
| Filter cake | 121 | 120 | 120 | 12 |
| (d) Oleophilic amine carboxylate-solution: | | | | |
| Armac C [2] | 0.4 | 0.7 | | |
| Duomac O [3] | | | 1.2 | |
| Duomac T [4] | | | | 3.6 |
| Water | 0.6 | 7.3 | | 7.2 |
| (e) Blend (c) and (d), min | 0.5 | 0.5 | 0.5 | 0.5 |
| (f) Drying*: Dried (105° C.) | X | X | X | X |

[1] Aluminum sulfate Al$_2$(SO$_4$)$_3$·14H$_2$O.
[2] Armac C, a trademark product, coco amine acetate.
[3] Duomac O, a trademark product, oleic 1,3-propylene diamine diacetate.
[4] Duomac T, a trademark product, N-tallow trimethylene diamine diacetate.
*The product of step (f) with or without micropulverizing, is a silica pigment composition dispersible in dry rubbers.

TABLE VIII.—TREATED SILICA
[Parts by weight]

| Example | 19 | 20 | 21 | 22 |
|---|---|---|---|---|
| Silica pigment slurry treated amine-carboxylate compounds: | | | | |
| (a) silica pigment aqueous slurry: | | | | |
| Alkaline silica pigment-I pH 9.8 | 150 | 150 | 150 | 150 |
| Dry solids basis | 15 | 15 | 15 | 15 |
| Water | 50 | 50 | 50 | 50 |
| (b) Reagent aqueous solution: | | | | |
| 2% aluminum sulfate [1] | 55 | | | |
| 2% zinc sulfate | | 45 | | |
| 2% calcium chloride | | | 35 | |
| 2% sulfuric acid | | | | 22.5 |
| Silica slurry pH | 5.0 | 6.5 | 8.0 | 7.0 |
| (c) Treated silica pigment: | | | | |
| Filtered (X) | X | X | X | X |
| Filter cake | 121 | 120 | 120 | 119 |
| (d) Oleophilic amine-carboxylate compound: | | | | |
| 25% diethyltriaminemonooleate [2] | 1.8 | | | |
| 25% diethyltriaminedioleate [2] | | 1.2 | 1.2 | |
| 25% diethyltriaminetrioleate [2] | | | | 1.8 |
| 28% aqueous ammonia | 1.0 | | | |
| (e) Blending (c) and (d): blender,[3] min | 0.2 | 0.2 | 0.2 | 0.2 |
| (f) Drying*: Spray dried (X) | X | X | X | X |

[1] Aluminum sulfate Al$_2$(SO$_4$)$_3$·14H$_2$O.
[2] Dissolved in benzene.
[3] Dissolved in benzene.
[4] Waring Blendor, a trademark product.
*The product of step (f) is a silica pigment composition dispersible in dry rubbers.

TABLE IX.—TREATED SILICA
[Parts by weight]

| Example | 23 | 24 | 25 | 26 |
|---|---|---|---|---|
| (a) Silica pigment slurry: | | | | |
| Alkaline silica pigment-I (pH 8.5) | 150 | 150 | 150 | 150 |
| Dry solids basis | 15 | 15 | 15 | 15 |
| Water | 50 | 50 | 50 | |
| (b) Reagent aqueous solution: | | | | |
| 2% aluminum sulfate [1] | 55 | | | |
| 2% zinc sulfate | | 45 | | |
| 2% sulfuric acid | | | 25.5 | |
| Silica slurry pH | 5.0 | 6.5 | 7.0 | 8.5 |
| (c) Treated silica pigment: | | | | |
| Filtered (X) | X | X | X | X |
| Filter cake | 120 | 128 | 134 | 154 |
| (d) Oleophilic amine-carboxylate treatment and solvent: | | | | |
| Duomeen O-monooleate [2] | 0.9 | | | |
| Duomeen T-dioleate [3] | | 1.5 | | |
| Armeen T-oleate [4] | | | 1.5 | |
| Armeen C-stearate [5] | | | | 1.5 |
| Benzene | 6.7 | 8.5 | 12 | 10.5 |
| (e) Blending (c) and (d): blender,[6] min | 0.5 | 0.5 | 0.5 | 0.5 |
| (f) Drying*: Dried (105° C.) (X) | X | X | X | X |

[1] Aluminum sulfate Al$_2$(SO$_4$)$_3$·14H$_2$O.
[2] Duomeen O-oleate, a trademark product, N-oleic trimethylene diamine monooleate.
[3] Duomeen TDO, a trademark product, N-tallow trimethylene diamine dioleate.
[4] Armeen TO, a trademark product, tallow-amine oleate.
[5] Armeen CT, a trademark product, coco amine stearate.
[6] Waring Blendor, a trademark product.
*The product of step (f), with or without micropulverizing, is a sicila pigment composition dispersible in dry rubbers.

TABLE X.—SILICA PIGMENT COMPOSITIONS INCLUDING CARBON BLACK AND PROCESSING OIL
[Parts by weight]

| Example | 27 | 28 | 29 | 30 |
|---|---|---|---|---|
| (A) Silica pigment slurry: | | | | |
| Alkaline silica pigment pH=8.5–9.5 | 25 | 25 | 25 | 25 |
| Dry solids basis | 2.5 | 2.5 | 2.5 | 2.5 |
| Water | 40 | 40 | 40 | 40 |
| (B) Reagent-aqueous solution: 2% aluminum sulfate [1] | 8.5 | 8.5 | | |
| (C) Combine (A) and (B): | | | | |
| Blend (X) | X | X | X | X |
| Filter (X) | X | X | X | X |
| (D) Oleophilic amine carboxylate: | | | | |
| Tallow amine acetate [3] | 0.25 | 0.25 | | |
| Coco amine acetate [3] | | | 0.25 | 0.20 |
| Water | 10 | 10 | 10 | 10 |
| (E) Combine (C) and (D): Blend,[4] min | 0.5 | 0.5 | 0.5 | 0.5 |
| (F) Carbon black and processing oil: | | | | |
| Philblack O [5] | 4 | 5 | | |
| Statex 160 HR [5] | | | 6 | |
| Sundex 2XH [5] | 1 | | | 0.5 |
| (G) Combine (E) and (F): Blend,[4] min | 0.5 | 0.5 | 0.5 | 0.5 |
| (H) Drying*: Dried, (105° C.) (X) | X | X | X | X |

[2] Aluminum sulfate Al$_2$(SO$_4$)$_3$·14H$_2$O.
[3] Armac T, a trademark product.
Armac C, a trademark product.
[4] Waring Blendor, a trademark product.
[5] Carbon black, a trademark product.
[6] Processing oil, a trademark product.
*The product of step (H), with or without micropulverizing, is a silica pigment composition dispersible in dry rubbers.

TABLE XI.—SILICA CARBON BLACK COMPOSITION
[Parts by weight]

| Example | 31 | 32 | 33 | 34 |
|---|---|---|---|---|
| (A) Silica pigment slurry: | | | | |
| Alkaline silica pigment-I pH=8.5–9.5 | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% sulfuric acid | 4.5 | 4.5 | | |
| 2% calcium chloride | | | 5.0 | 5.0 |
| (C) Combine (A) and (B): | | | | |
| Blend (X) | X | X | X | X |
| Filter (X) | X | X | X | X |
| (D) Oleophilic amine carboxylate-solution: | | | | |
| Triethanolamine stearate | 0.33 | 0.33 | | |
| Tallow 1,3-propylenediamine acetate [2] | | | 0.2 | 0.2 |
| Water | 5 | 5 | 5 | 5 |
| (E) Carbon black: | | | | |
| Statex 160 HR [3] | 5 | 10 | | |
| Thermax [3] | | | 5 | 10 |
| (F) Combine (C) and (D) then (E): Blend,[1] min | 0.5 | 0.5 | 0.5 | 0.5 |
| (G) Drying*: Dried (105° C.) (X) | X | X | X | X |

[1] Waring Blendor, a trademark product.
[2] Duomac T, a trademark product.
[3] Carbon black, a trademark product.
*The product of step (G), with or without micropulverizing, is a silica pigment composition dispersible in dry rubbers.

TABLE XII.—SILICA-POLYMER MASTERBATCH
[Parts by weight]

| Example | 35 | 36 | 37 | 38 |
|---|---|---|---|---|
| (A) Silica pigment slurry: | | | | |
| Alkaline silica pigment-I (pH=8.5–9.5) | 25 | 25 | 25 | 25 |
| Dry solids basis | 5 | 5 | 5 | 5 |
| Water | 20 | 20 | 20 | 20 |
| (B) Reactant-aqueous solution: | | | | |
| 2% aluminum sulfate [1] | | | | |
| 2% calcium chloride | | | | |
| (C) Blend (A) and (B): | | | | |
| Blend (X) | X | X | X | X |
| Filter (X) | X | X | X | X |
| (D) Oleophilic amine carboxylate: | | | | |
| 33%* tallow amine acetate [2] | 1.1 | 1.1 | | |
| 33%* coco amine acetate [3] | | | 1.1 | 1.1 |
| (D) Blend (C) and (D): Blend (X) | X | X | X | X |
| (E) Carbon black: | | | | |
| Philblack O [4] | 5 | 5 | | |
| Statex 160 [4] | | | 5 | |
| (F) Processing oil: Sundex 2XH [4] | 0.7 | | | 0.5 |
| (G) Polymer latex: | | | | |
| Butadiene-styrene [5] | 76.2 | 76.2 | 76.2 | 25.5 |
| Dry solids basis | 15 | 15 | 15 | 5 |
| Antioxidant [6] | 0.3 | 0.3 | 0.3 | 0.1 |
| (H) Combine (D), (E), (F) and (G): Blend (X) | X | X | X | X |
| (I) Coagulant-aqueous reactant solution: | | | | |
| 2% zinc sulfate | 60 | | | |
| 2% calcium chloride | | 60 | | |
| 2% magnesium chloride | | | 50 | |
| 2% barium Chloride | | | | 50 |

See footnotes at end of table.

TABLE XII—Continued

| Example | 35 | 36 | 37 | 38 |
|---|---|---|---|---|
| (J) Coagulation: | | | | |
| Combine (H) and (I), (X) | X | X | X | X |
| pH of serum | 6.5 | 9.0 | 6.5 | 6.5 |
| Free silica in serum | None | None | None | None |
| (K) Masterbatch: | | | | |
| Filter and wash (X) | X | X | X | X |
| Dried (105° C.) (X) | X | X | X | X |

1 Aluminum sulfate $Al_2(SO_4)_3 \cdot 14H_2O$.
2 Armac T, a trademark product.
3 Armac C, a trademark product.
4 A trademark product.
5 SB-R 1512 (dry solids 19.7%).
6 The antioxidant is 2,2′-methylene-bis-(4-methyl-6-t.-butylphenol).

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the co-pending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:
1. A process for the curbing of silica pigment losses and the promotion of uniformity of product in the preparation of a silica pigment-elastomer masterbatch from
   (a) aqueously wet hydrated silica pigment, and
   (b) an elastomer;
which process comprises the steps of:
   (c) providing an aqueous dispersion containing (1) 100 parts by weight of the elastomer and (2) from 0.5 to 15 parts by weight of anionic dispersing agent;
   (d) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali metal silicate with the aid of carbon dioxide; and which has continuously been maintained in an aqueous phase without having been dried after its precipitation;
   (e) providing a quantity of from 0.1 to 20%, dry weight, based on the silica pigment referred to in step (d), of olephilic amine carboxylate material selected from the group consisting of neutral, basic and acidic carboxylic acid salts of amines;
   (f) providing a supply of reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of two or more members selected from Groups (I), (II) and (III);
   (g) combining the wet silica pigment provided by step (d) with reactant material selected from those provided in step (f) in an amount in the range of from 0 to at least about a stoichiometric equivalent of the alkalinity of the said pigment, thereby providing a wet silica pigment for use in step (h);
   (h) combining the wet silica pigment provided by step (g) with the oleophilic amine carboxylate provided by step (e);
   (i) combining with the oleophilic wet silica pigment prepared by step (h), (I) the aqueous dispersion of elastomer provided by step (c), (II) from 0 to 75 parts by weight of carbon black with the limitation that the total of silica pigment and carbon black, dry basis, not exceed 80 parts by weight, (III) from 0 to 45 parts by weight of processing oil, and (IV) sufficient of the reactant material provided in step (f) to cause coagulation of the solids of the combination, whereby there is formed a coagulum of such solids rendering the aqueous serum of the combination essentially free of silica pigment; and
   (j) recovering the coagulum as a masterbatch.

2. A process as claimed in claim 1 wherein at least a part of the reactant employed to cause coagulation of the solids in step (i) is supplied as excess in the practice of step (g).

3. A process as claimed in claim 1 wherein the reactant material employed in step (g) comprises, about said stoichiometric amount of reactant provided in step (f).

4. A process as claimed in claim 1 wherein steps (g), (h) and (i) are practiced by runinng together streams of the materials employed in such steps in the order referred to therein.

5. A process as claimed in claim 1, in which the aqueous dispersion of polymer provided in step (c) is a dispersion prepared by aqueous emulsion polymerization of monomer material having and polymerizable through at least one ethylenically unsaturated group.

6. A process as claimed in claim 5, in which at least 5 parts by weight of carbon black are employed in step (i).

7. A process as claimed in claim 5, in which at least 5 parts by weight of processing oil are employed in step (i).

References Cited

UNITED STATES PATENTS

| | | | |
|---|---|---|---|
| 2,047,128 | 7/1936 | Park | 106—308 N |
| 2,383,653 | 8/1945 | Kirk | 106—308 N |
| 2,607,753 | 8/1952 | Adams | 260—41 |
| 2,635,057 | 4/1953 | Jordan | 106—308 N |
| 2,821,232 | 1/1958 | Wolf | 152—330 |
| 2,982,665 | 5/1961 | Wilcox | 106—308 N |
| 3,172,726 | 3/1965 | Burke et al. | 23—182 |
| 3,392,140 | 7/1968 | Maahs et al. | 260—41.5 |
| 3,250,594 | 5/1966 | Burke et al. | 23—182 |

OTHER REFERENCES

Whitby, G. S.: Synthetic Rubber, John Wiley & Sons, Inc., New York, 1954, pages 670 and 677.

Morton, Maurice: Introduction to Rubber Technology, Reinhold Pub. Corp., New York, 1959, pages 169–171.

MORRIS LIEBMAN, Primary Examiner

J. H. DERRINGTON, Assistant Examiner

U.S. Cl. X.R.

106—308 F, 308 N; 260—41.5 R, 41.5 A, 41.5 MP